(12) United States Patent
Ziolek et al.

(10) Patent No.: US 10,118,511 B2
(45) Date of Patent: Nov. 6, 2018

(54) SEAT DEVICE FOR VEHICLE

(71) Applicants: Hyundai America Technical Center, Inc., Superior Township, MI (US); HYUNDAI MOTOR COMPANY, Seoul (KR); KIA MOTORS CORPORATION, Seoul (KR)

(72) Inventors: Scott Ziolek, Ann Arbor, MI (US); Amanda Christiana, Ann Arbor, MI (US); Isaac Yeo, Ann Arbor, MI (US); Thomas Moco, Brighton, MI (US); Lang Sui, Ann Arbor, MI (US); Yeonhwa Choi, Hartland, MI (US)

(73) Assignees: HYUNDAI AMERICA TECHNICAL CENTER, INC., Superior Township, MI (US); HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 211 days.

(21) Appl. No.: 15/185,915

(22) Filed: Jun. 17, 2016

(65) Prior Publication Data

US 2017/0361737 A1 Dec. 21, 2017

(51) Int. Cl.
*B60N 2/30* (2006.01)
*B60N 2/32* (2006.01)

(52) U.S. Cl.
CPC ......... *B60N 2/3056* (2013.01); *B60N 2/3045* (2013.01); *B60N 2/32* (2013.01)

(58) Field of Classification Search
None
See application file for complete search history.

(56) References Cited

U.S. PATENT DOCUMENTS

| | | | | |
|---|---|---|---|---|
| 3,568,825 A | * | 3/1971 | Munger | B65G 25/08 198/746 |
| 3,813,122 A | * | 5/1974 | Wemyss | B63B 21/54 114/230.26 |
| 4,934,750 A | * | 6/1990 | Eichler | B60R 7/04 296/37.8 |

(Continued)

FOREIGN PATENT DOCUMENTS

| | | |
|---|---|---|
| JP | 2006-143105 | 6/2006 |
| JP | 2007-230488 | 9/2007 |
| KR | 10-1134875 | 4/2012 |

*Primary Examiner* — David E Allred
(74) *Attorney, Agent, or Firm* — Brinks Gilson & Lione

(57) ABSTRACT

A seat device for a vehicle includes: a seat cushion and a seat base of a rear row seat, the seat base mounted on a floor of a vehicle standing upward from the floor and forming a support structure of the seat cushion; a movable cushion portion forming a sitting surface for a passenger; a seat-cushion-moving mechanism to rotate and translate the movable cushion portion so that the movable cushion portion moves between a seating position, an extended position, and a tray position. In particular, a passenger sits on the movable cushion portion in the seating position, the movable cushion portion rotates away from the seat base in the forward direction to expose a lower side of the movable cushion portion in the extended position, and the tray position is obtained when the movable cushion portion translates rearwardly from the extended position with the lower side remaining exposed.

8 Claims, 15 Drawing Sheets

(56) References Cited

U.S. PATENT DOCUMENTS

| | | | | |
|---|---|---|---|---|
| 5,498,062 | A * | 3/1996 | Holdampf | B60N 2/3084 297/14 |
| 5,564,780 | A * | 10/1996 | Presser | B60N 2/2878 297/238 |
| 5,720,514 | A * | 2/1998 | Carlsen | B60N 3/107 297/188.1 |
| 5,730,491 | A * | 3/1998 | Carlsen | B60N 3/083 297/188.19 |
| 5,788,326 | A * | 8/1998 | Kawade | B60N 2/2812 248/419 |
| 6,328,384 | B1 * | 12/2001 | Yamauchi | B60N 2/753 297/411.29 |
| 6,719,343 | B2 | 4/2004 | Emerling et al. | |
| 7,014,241 | B2 * | 3/2006 | Toyota | B60N 2/3018 296/37.15 |
| 7,114,755 | B1 | 10/2006 | Sturt et al. | |
| 7,134,727 | B2 * | 11/2006 | Williams | A47C 17/04 297/411.32 |
| 7,850,244 | B2 * | 12/2010 | Salewski | B60N 2/757 297/411.32 |
| 8,596,714 | B2 * | 12/2013 | Whitman | B60R 7/043 224/275 |
| 9,676,301 | B2 * | 6/2017 | Sam | B60N 2/26 |
| 2007/0205642 | A1 | 9/2007 | Bejin et al. | |
| 2009/0302661 | A1 * | 12/2009 | Melhuish | A47C 1/03 297/411.35 |
| 2012/0086243 | A1 * | 4/2012 | Daniels, Jr. | B25H 3/02 297/188.09 |
| 2017/0101035 | A1 * | 4/2017 | Sam | B60N 2/30 |

* cited by examiner

SEAT DEVICE FOR VEHICLE

FIELD

The present disclosure relates to a seat device for a vehicle operative to provide multiple seat arrangements and a storage space.

BACKGROUND

The statements in this section merely provide background information related to the present disclosure and may not constitute prior art.

The present disclosure relates to a seat device for a vehicle that comprises a front row seat and a rear row seat. The front row seat on a floor panel includes a driver's seat and an assistant's seat that are disposed side by side, and the rear row seat is provided behind the front row seat. A center seat may be located between the seat of the front row seat or between the seats of the rear row seat.

Many interior designs have been developed to enhance the aesthetic appearance and to provide comfort, as well as convenience, to vehicle occupants. For example, many automotive vehicles include a center console or other storage device disposed between the driver and assistant's seats in the front passenger compartment of the vehicle. The console has many functions. For example, in addition to operating as a storage unit, the console may operate as an armrest or as a writing table or general work surface for an occupant of the front passenger compartment. Additionally, the console may include one or more cup holders, a coin compartment and other convenience features desired by vehicle occupants.

While convenience features incorporated into the consoles of many automobiles have been meeting the desires and needs of the front passenger compartment occupants, we have discovered that providing many of these features to the rear row or second row seat occupants in the rear passenger compartment are more challenging because of the presence of the center seat to provide a seating surface to be seated by a third passenger. For example, while the center seat is occupied, a storage tray or a cup holder formed in either an armrest or on a side of the center seat cannot be used.

Moreover, the front row seat passengers (e.g., a driver and a front passenger seat occupant) have limited access to the storage tray or cup holders formed in the armrest or the center seat of the rear row seat so that convenience features incorporated into the rear row seat would not be utilized properly.

In addition to increase the usage of a storage space formed in a console or armrest, interior designs have been developed to provide convenient seat arrangements to commit to various user needs. For example, a seat device for a vehicle disclosed in U.S. Pat. No. 7,527,315 provides a large-scaled storage space by moving a center seat cushion of a rear row seat and thus improves convenience. In a normal state, the center seat cushion becomes a center seat cushion that can provide a space for a third passenger sitting in the rear row seat. The center seat cushion moves upward and forward from its normal state so that a large-scaled storage space is provided.

As a center-seat-moving mechanism to move the center seat cushion, however, the seat device requires complicate link mechanisms. The center-seat-moving mechanism includes a pair of brackets fixed on a floor, a base member, a pair of pivot bracket, a pair of link members, each of which are provided on front and rear sides, and thus in total, four of the link members form the moving mechanism. This type of moving mechanism increases the weight and cost of manufacturing a seat device, as well as a high possibility of malfunction of the moving mechanism due to many parts assembled.

SUMMARY

The present disclosure provides a seat device for a vehicle improving utilization of convenience features incorporated into a rear row seat and providing more storage for backseat passengers.

One form of the present disclosure provides a seat device for a vehicle, the seat device including: a seat cushion and a seat base, the seat base mounted on a floor of a vehicle standing upward from the floor and forming a support structure of the seat cushion; a movable cushion portion having an upper surface configured to form a sitting surface for a passenger; a seat-cushion-moving mechanism to rotate and translate the movable cushion portion so that the movable cushion portion moves between a seating position where the passenger sits on the upper surface of the movable cushion portion, and an extended position where the movable cushion portion at least partly moves away from the seat base.

In particular, the seat-cushion-moving mechanism includes: first and second pins to move along a groove formed on one of a side of the movable cushion portion or a side of the seat base; and a pin shuttle cooperating with the groove and guiding translational and rotational movements of the movable cushion portion relative to the seat base, the pin shuttle configured to associate with one of the first or second pins to rotate the movable cushion portion.

The seat device may include following additional configurations: the groove including a linear portion and a first curved portion, the first curved portion having one end intersecting with the linear portion at a location spaced away from an end of the linear portion;

the groove including a second curved portion having one end intersecting with the linear portion, and the second curved portion is located at opposite to the first curved portion;

the seat device further comprising a spring strip located along the groove and configured to provide a locking position formed by a recessed portion of the spring strip;

the locking position being located at ending point of the translational or rotational movements of the movable cushion portion;

the groove including a linear portion and first and second curved portions, the first curved portion having one end intersecting with the linear portion at a first location spaced away from an end of the linear portion, and the second curved portion having one end intersecting with the linear portion at a second location opposite to the first curved portion;

the opening of the pin shuttle configured to receive or release the first pin at the first and second locations;

the seat base including a top tray and a bottom tray, forming a storage space;

the pin shuttle being elongated and at one end pivotally fixed around the second pin, and other end of the pin shuttle forming an opening to receive and hold the first pin in the extended position.

In another form of the present disclosure, a seat device for a vehicle includes a seat base, a seat cushion having a movable cushion portion, and a seat-cushion moving mechanism. The seat base is mounted on a floor of a vehicle standing upward from the floor and configured to form a support structure of the seat cushion. The movable cushion portion of the seat cushion is configured to form a sitting surface for a passenger.

The seat-cushion-moving mechanism is configured to turn over the movable cushion portion so that the movable cushion portion moves between a seating position where the passenger sits on the movable cushion portion, and an extended position where the movable cushion portion in part moves away from the seat base.

The seat-cushion-moving mechanism includes a pin and a longitudinal groove. The pin is located at a front end of the seat base, and the movable cushion portion is configured to rotate around the pin to be situated in the extended position. The longitudinal groove is positioned laterally to the side of the movable cushion portion, and the pin is configured to translate the movable cushion portion so that the movable cushion portion covers an upper opening of the seat base.

According to another form of the present disclosure, the longitudinal groove is formed in one or more of, an adjacent portion of the seat cushion, a second seat cushion located laterally adjacent to the moveable cushion portion, and the seat base.

In still another form, the seat device includes a slot formed in the movable cushion portion, and the pin passes through the slot so as to disassemble the movable cushion portion from the seat base.

In other form, a location of the movable cushion portion in the tray position is vertically above a location of the movable cushion portion in the seating position.

According to another form of the present disclosure, a seat device for a vehicle, the vehicle defining forward and rearward directions, the seat device comprising a seat cushion having a movable cushion portion, a seat base, and a seat-cushion-moving mechanism.

The seat base is mounted on a floor of a vehicle standing upward from the floor and configured to form a support structure of the seat cushion.

The movable cushion portion is configured to form a sitting surface for a passenger, and in one form, the movable cushion portion is provided at a center portion of the seat cushion.

The seat-cushion-moving mechanism is configured to rotate and translate the movable cushion portion so that the movable cushion portion moves between seating, extended and tray positions.

In the seating position, the passenger sits on the movable cushion portion, and in the extended position, the movable cushion portion rotates away from the seat base in the forward direction to expose a lower side of the movable cushion portion. In the tray position, the movable cushion portion translates rearwardly from the extended position with the lower side remaining exposed.

The seat-cushion-moving mechanism may include first and second pins that move along a groove formed on one of a side of the movable cushion portion or a side of the seat base. In particular, the first pin is configured to guide linear and rotational movements of the movable cushion portion relative to the seat base, while the second pin is configured to guide linear movement of the movable cushion portion.

In another form, the first and second pins are fixed on the side of the seat base, and the groove is formed on the side of the movable cushion.

According to another form, a length of the first pin is longer than a length of the second pin, and a diameter of the first pin is larger than a diameter of the second pin, and in particular, the groove in part has a complimentary two-step-shaped cross-section configured to guide the corresponding first and second pins.

In still another form, the groove includes a linear portion and a first curved portion, the first curved portion having one end intersecting with the linear portion at a location spaced away from an end of the linear portion.

In other form, the groove includes a second curved portion having one end intersecting with the linear portion, and the second curved portion is located at opposite to the first curved portion.

According to still another form, the movable cushion portion further includes an access position where the movable cushion portion rotates upwardly and rearwardly from the tray position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
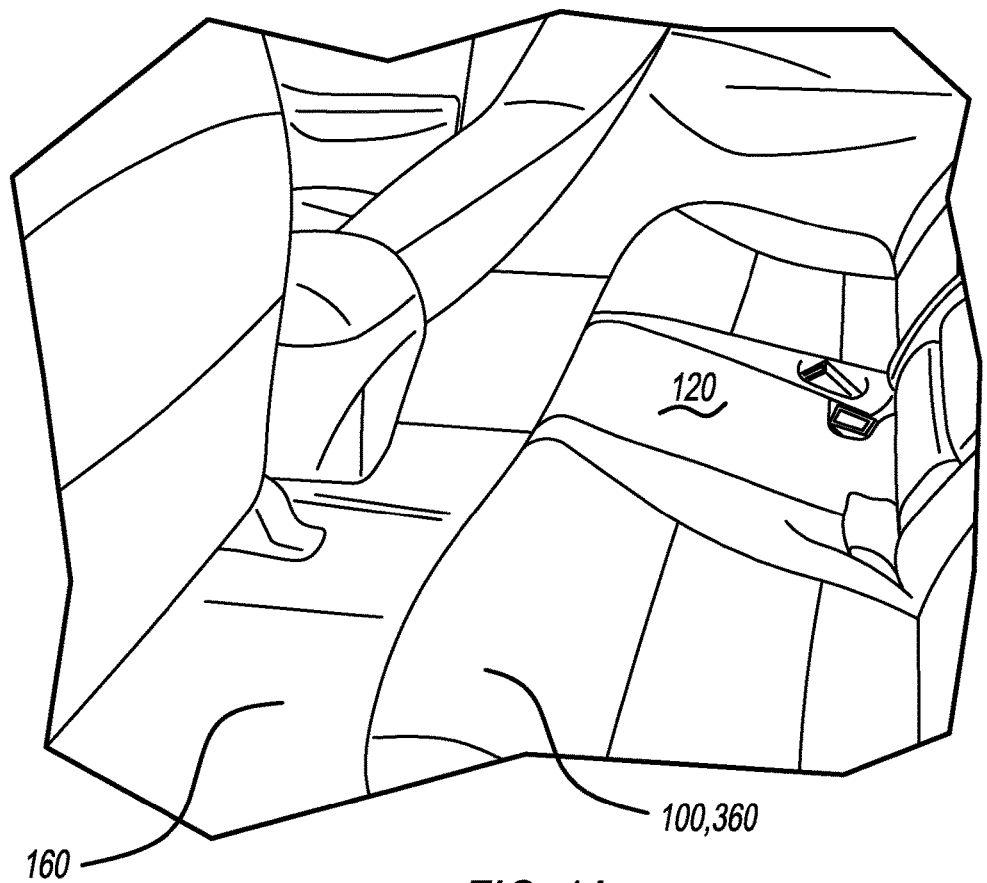
FIGS. 1A-1B are perspective views of a regular seating configuration of a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1A to 3B, the present disclosure provides a seat device 1 for a vehicle. The vehicle generally defines forward and rearward directions, and the seat device includes: a seat cushion 100 and a seat base 110. In the depicted embodiment, the seat cushion 100 and seat base 110 have been shown as a rear row seat, although the seat device of the present disclosure can be used in any seat row, in many types of vehicles having different numbers of rows of seats. The seat cushion 100 includes a movable-cushion portion 120 forming a sitting surface 122 for a passenger; and a seat-cushion-moving mechanism 200 configured to rotate and translate the movable cushion portion 120 so that the movable cushion portion moves between a seating position (e.g. FIGS. 1A and 1B) and an extended position (e.g. FIGS. 2A and 2B).

In particular, the seat base 110 is mounted on a floor 160 of a vehicle and stands upward from the floor, forming a support structure of the seat cushion. In the seating position, a passenger may sit on the movable cushion portion, and in the extended position, the movable cushion portion 120 at least partly moves away from the seat base 110.

Figure 4:
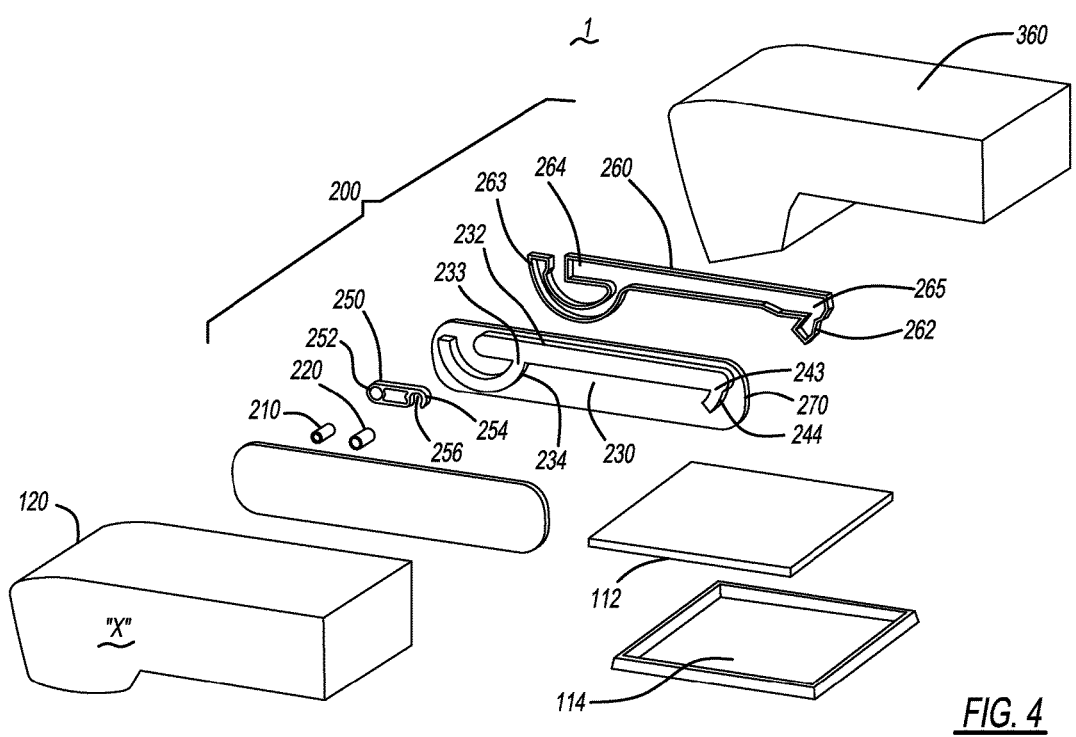
FIG. 4 is a detailed view of illustrating a moving mechanism of first form of the present disclosure.

Moreover, and as best seen in FIG. 4, the seat-cushion-moving mechanism 200 includes: a first pin 210 and a second pin 220 that move along a groove 230; and a pin shuttle 250. The groove 230 is formed on one of a side of the movable cushion portion 120 or a side of the seat base 110, and the pin shuttle 250 cooperates with the groove 230 and guides translational ("T") and rotational ("R") movements of the movable cushion portion 120 relative to the seat base. The pin shuttle 250 is configured to associate with one of the first or second pins 210, 220 to rotate the movable cushion portion.

Figure 1B:
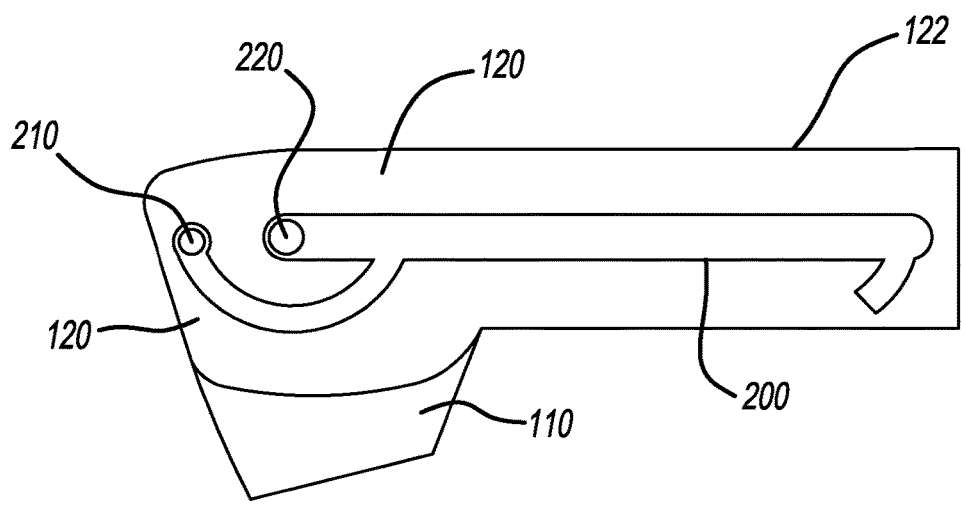
Figure 2A:
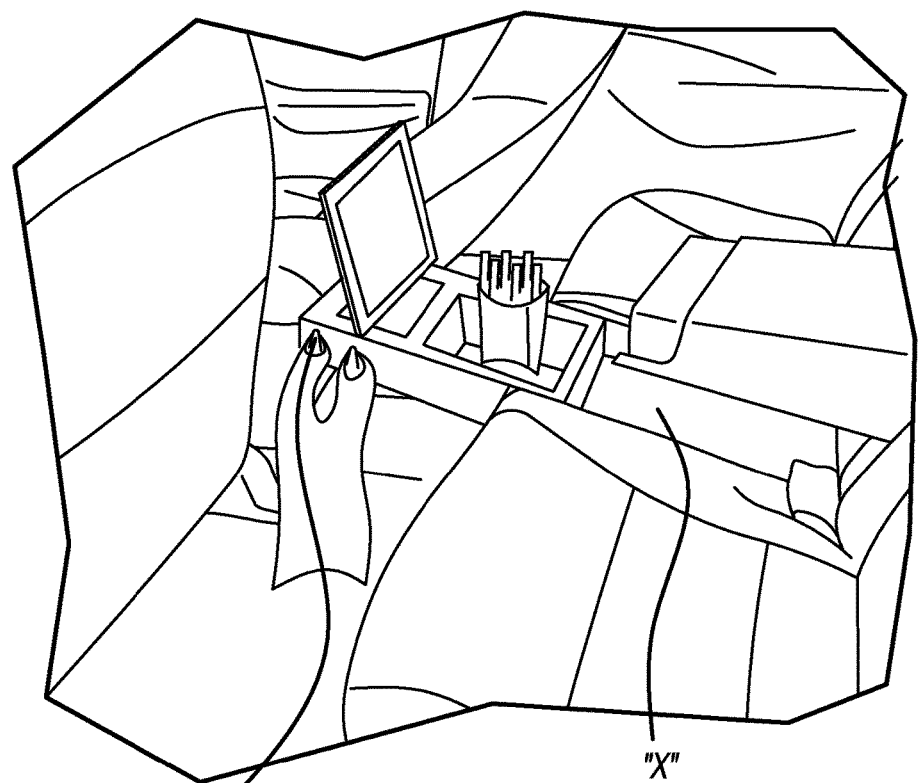
FIGS. 2A-2B are perspective views of an extended console configuration of a first form of the present disclosure.
Figure 2B:
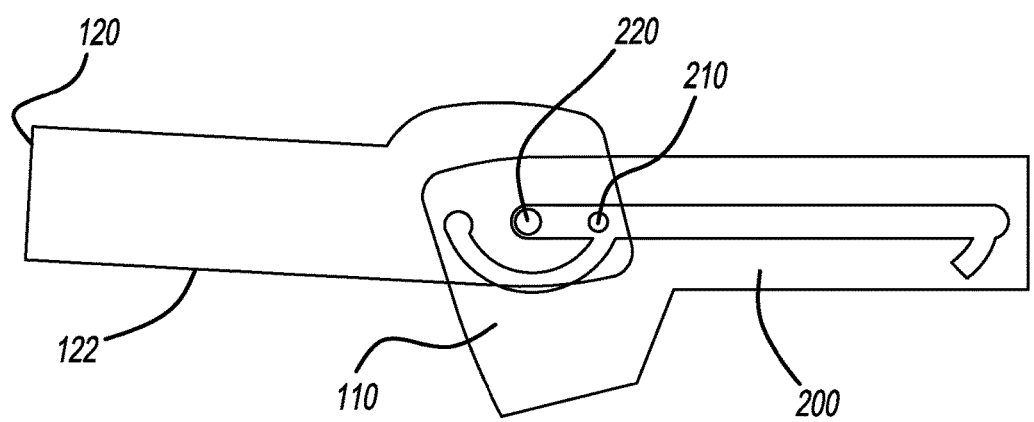
Figure 3A:
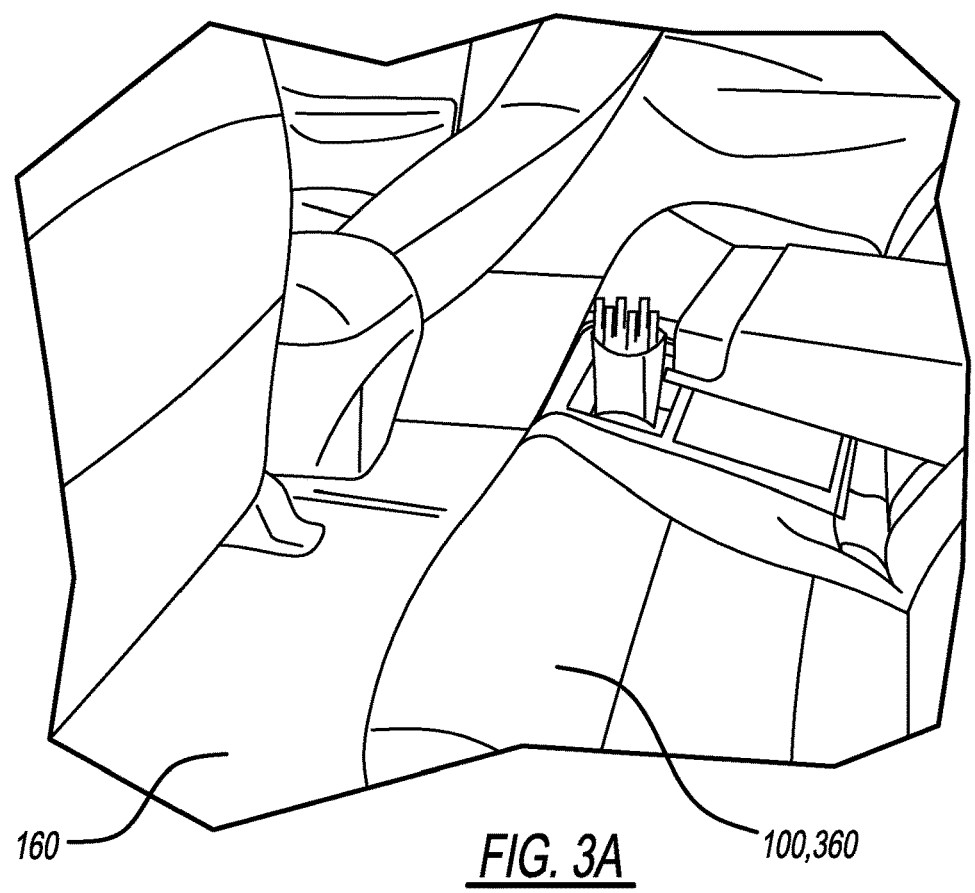
FIGS. 3A-3B are perspective views of a storage tray configuration of first form of the present disclosure.
Figure 3B:
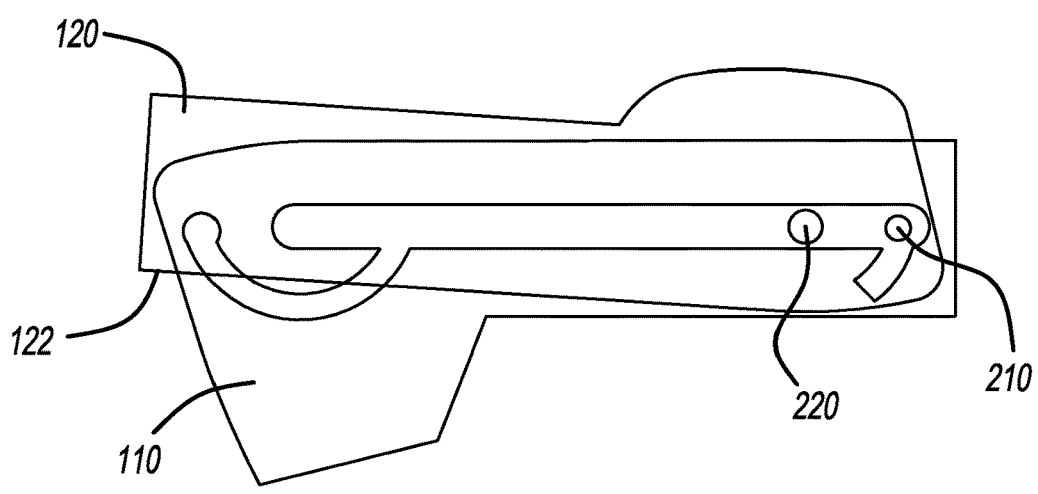

With these structural arrangements, as illustrated in FIGS. 1A, 2A, and 3A, the present disclosure provides a regular seating configuration, an extended configuration and a storage tray configuration, respectively. FIGS. 1B, 2B, and 3B illustrate a cross-sectional view of the movable cushion portion 120, corresponding to FIGS. 1A, 2A and 3A, respectively. In the regular seating position in FIG. 1A, the movable cushion portion 120 provides a sitting surface on which a passenger may sit and a storage space "X" formed by a top storage tray 112 and a bottom storage tray 114 as in FIG. 4 is covered by the movable cushion portion so that the storage space "X" is not accessible from outside.

FIGS. 2A and 2B illustrate the extended seating arrangement to provide a passenger or a driver an access to the storage space "X" and other additional utility space or accessories. For example, in the extended seating arrangement, a driver can place the driver's personal items (e.g., a purse or a bag) on the top of the movable cushion portion as it is extended forward and situated near a driver seat by a seat-cushion-moving mechanism 200. The seat-cushion-moving mechanism 200 allows the movable cushion portion translates in forward and reward directions of the vehicle and also rotates around a pivot axis (e.g., first or second pins 210, 220) of the seat base 110 mounted on the floor 160 of a vehicle so as to form a support structure below the seat cushion.

The extended seating arrangement is obtained by moving the movable cushion portion in the forward direction, and namely rotating it so that the upside of the movable cushion portion is facing down (and likewise the underside of the moveable cushion portion is facing upwards and exposed). As a result, the storage space "X" formed in the seat base 110 is revealed. The extended seat arrangement provides an extra space to store personal items and thereby improves convenience and meets various desires of occupants in the vehicle.

Figure 6A:
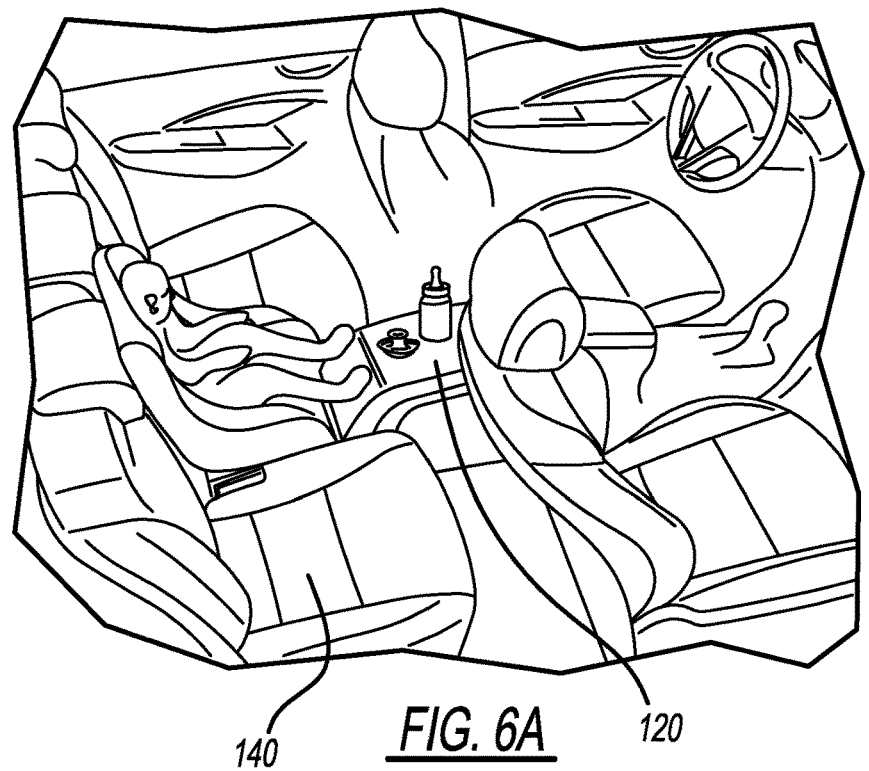
FIGS. 6A-6C are illustrating exemplary applications of the extended console configuration of FIG. 2.
Figure 6B:
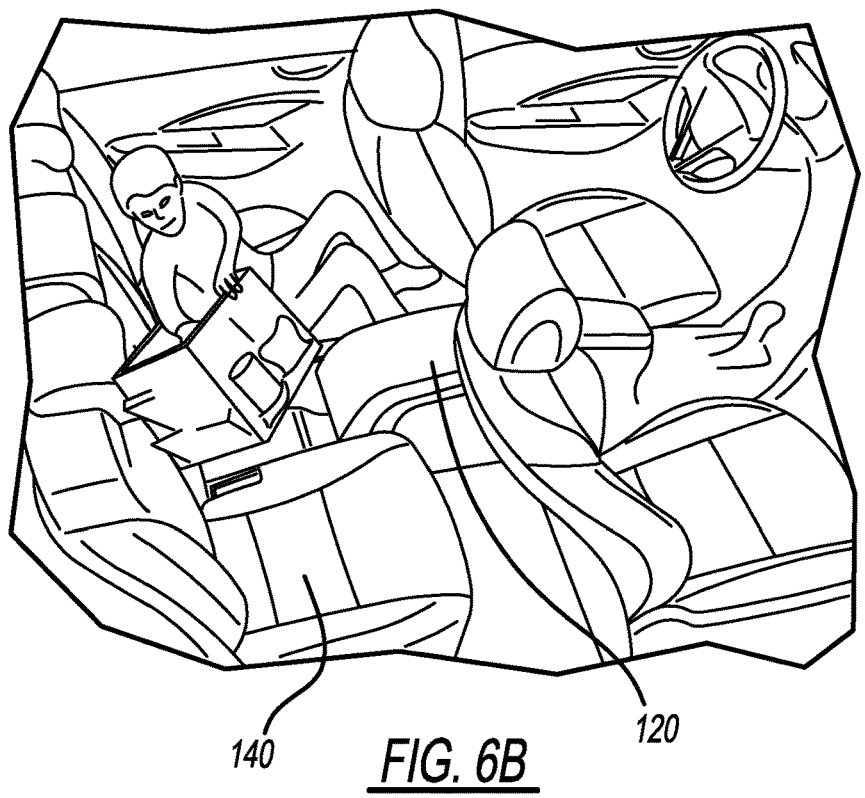
Figure 6C:
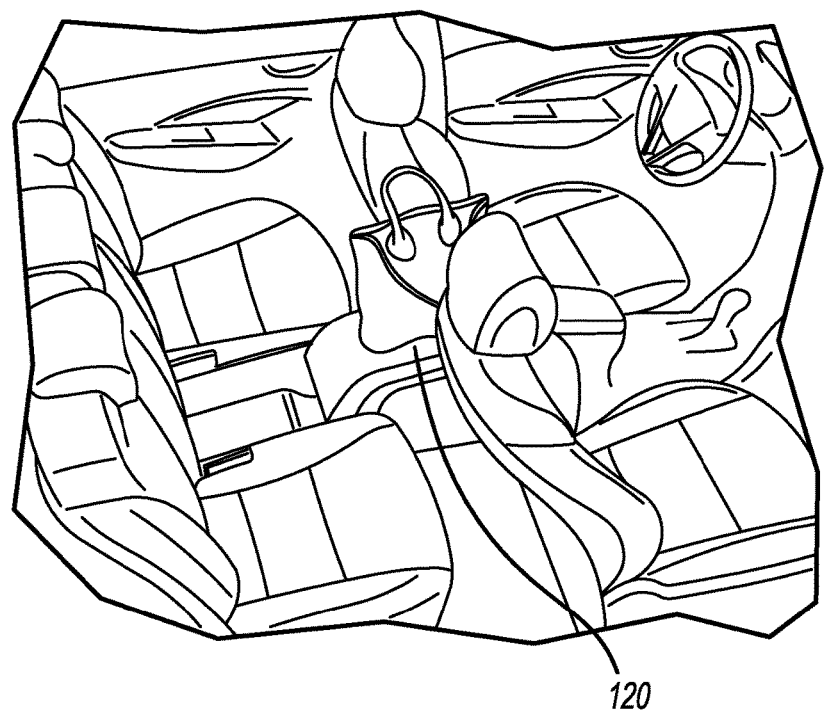

For instance, as illustrated in FIGS. 6A-6C, the exposed upward surface in the area of the moveable cushion portion 120 and seat base 110 can be configured such that a baby seat can be secured on the top of the seat base 110. Other items such as a storage box can also be placed in this area, while the upper side of the movable cushion 120 is extended (i.e., a lower side of the movable cushion in the regular seating position in FIGS. 1A and 1B). This provides additional table space to place electronic devices, or a bag etc. The presence of the storage space and additional table space near a driver's seat improves a user's convenience and provides various seat arrangements according to the user's needs. Additionally, sides of the movable cushion portion 120 may include a hook 124 to hang an object. In another form, the upper portion of the movable cushion in the extended console configuration may form a cup holder or an open tray to provide additional convenience features.

In still another form, the movable cushion portion 120 may be extended forward so that the movable cushion portion may rest on the center console or other structural support member located in front of the moveable cushion portion. This extended seat arrangement may provide a table or tray common to a rear seat passenger and a front seat passenger or an extra storage space for a front seat occupant in need. For example, when the center console of the front row seat is not available.

FIGS. 3A-3B describe another seat arrangement (i.e., a tray position of the movable cushion portion), which is accomplished when a user translates the movable cushion 120 rearward from the extended seat arrangement position (FIGS. 2A, 2B) so that the movable cushion portion 120 covers the storage space "X" while the lower side of the movable cushion portion remains exposed. With this arrangement, the user still may use the open tray formed in the lower side of the movable cushion portion. In addition, a user may lift a front end of the movable cushion portion thereby rotating it so that the storage space "X" is accessible from outside.

One form of the seat-cushion-moving mechanism 200 is illustrated in FIG. 4. The seat-cushion-moving mechanism 200 is configured to rotate and translate the movable cushion portion 120 so that the movable cushion portion moves between the seating position where a passenger sits on the movable cushion portion, and the extended position where the movable cushion portion in part moves away from the seat base.

As illustrated in FIG. 4, the seat-cushion-moving mechanism 200 includes the groove 230, and the groove 230 includes a linear portion 232, a first curved portion 234, and a second curved portion 244. The first curved portion 234 has one end intersecting with the linear portion 232 at a location 233 spaced away from an end of the linear portion so as to transit the translational movement "T" (e.g., linear movement) of the movable cushion portion to the rotational movement "R". Similarly, the second curved portion 244 has an end intersecting with the linear portion 232 at a location 243, the second curved portion 244 is located at opposite to the first curved portion 234.

In another form of the present disclosure, the seat device may further comprise a spring strip 260 located along the groove 230 so as to provide locking positions 262, 263, 264, 265, which are formed by a recessed portion of the spring strip 260 as shown in FIG. 4. The spring strip 260 has a complimentary shape to the groove 230 and may be attached on either a side of the movable cushion portion or a side of the seat base 110 in a way of surrounding in part or entirely the groove having the liner and curved portions, 232, 234, 244. With this arrangement, the spring strip 260 provides an additional supporting structure to inhibit the first and second pins 210, 220 from deviating or falling from the groove 230 as the movable cushion portion moves along the groove by means of the pin shuttle 250 and the pins 210, 220. The pin shuttle 250 is elongated and at one end 252 pivotally fixed around the second pin 220, and the other end 254 forms an opening 256 to receive and hold the first pin 210 in the extended position.

As illustrated in FIG. 4, the locking positions 262, 263, 264, 265, which are formed by a recessed portion of the spring strip 260, may be a wider portion in width relative to other portion of the groove 230 and thus function to hold a pin 210, 220 so that a more pressure needs to escape the pin(s) from the locking positions. In one form, the locking position(s) is located at ending point of the translational or rotational movements of the movable cushion portion 120. In one form, the spring strip 260 may be formed of a polymeric material to control the rate and feel of movement of the moveable seat portion, such as nylon or the like, especially where the groove 230 is formed in a material such as metal. Likewise, the spring strip 260 may be eliminated, e.g. where the material defining the groove 230 provides the desired movement characteristics, and thus the locking positions can be directly formed in the groove 230.

As discussed further herein, it will be understood by the skilled artisan that the groove 230 may be formed in the seat base 110 or the seat cushion laterally adjacent the moveable seat portion, with the pin(s) 210, 220 attached to the moveable seat portion, or alternatively the arrangement may be reversed such that the groove 230 is formed in the side surface of the moveable cushion portion 120 with the pins affixed to the seat base or laterally adjacent seat cushion.

Figure 5A:
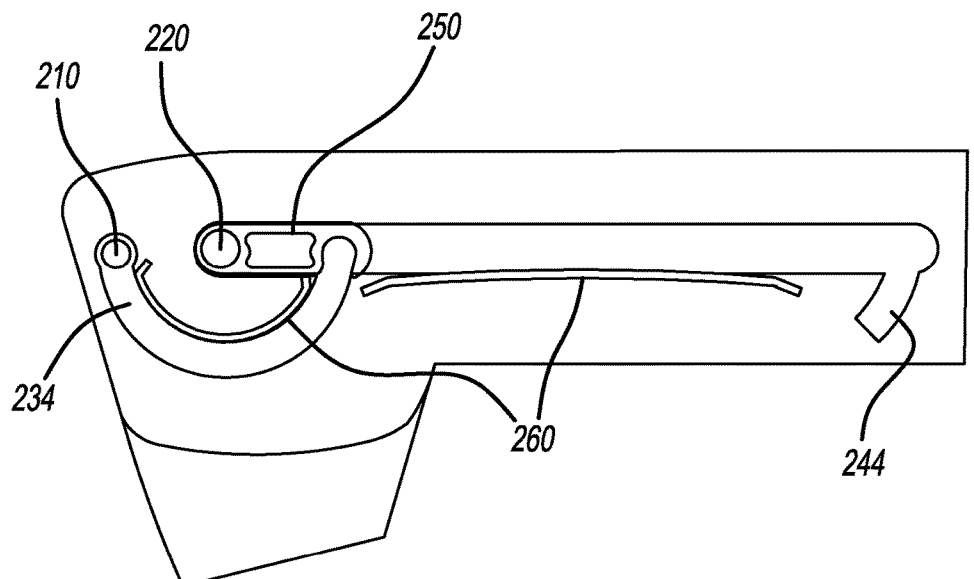
FIGS. 5A-5D are illustrating seat arrangements of FIG. 4.

FIGS. 5A, 5B, 5C and 5D illustrate a seating position, an extended position, a tray position and an access position of the movable cushion portion, respectively. The opening 256 of the pin shuttle 250 functions to receive or release the first pin 210 at the first and second locations 233, 243 depending on a position of the movable cushion portion. FIG. 5A shows the seat-cushion-moving mechanism 200 in the regular seating position where a passenger may sit on the movable cushion portion 120, which may be located at a center portion of the seat cushion 100. In the regular seating position, the first pin 210 rests in one end of the first curved portion 234 corresponding to a locking position 263, and the second pin 220 is located in one end of the linear portion 232 corresponding to a locking position 264 of the spring strip 260. In one form, the spring strip 260 may be installed along part of the groove or the entire outline of the groove 230 to provide the pin shuttle 250 and pins 210, 220 supplemental guidance for the movements of the movable cushion portion 120.

Figure 5B:
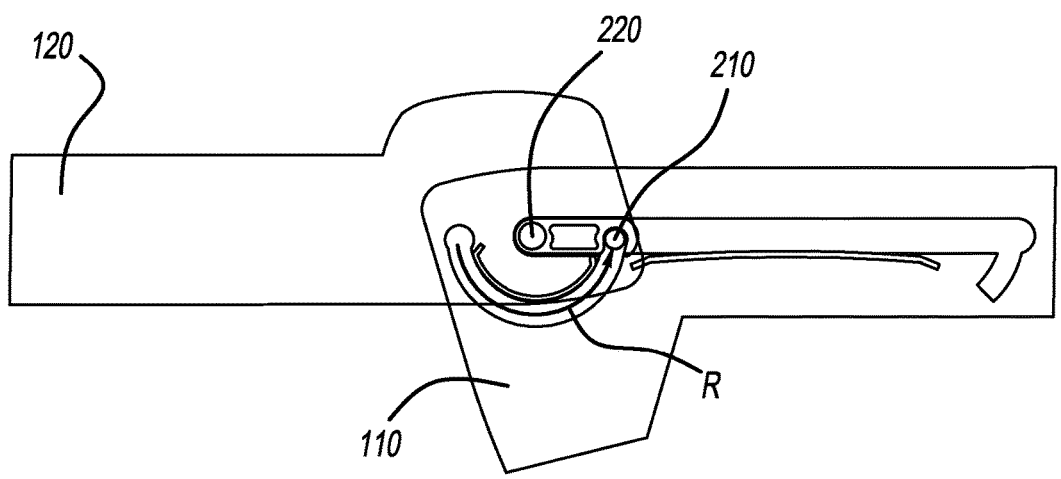
Figure 5C:
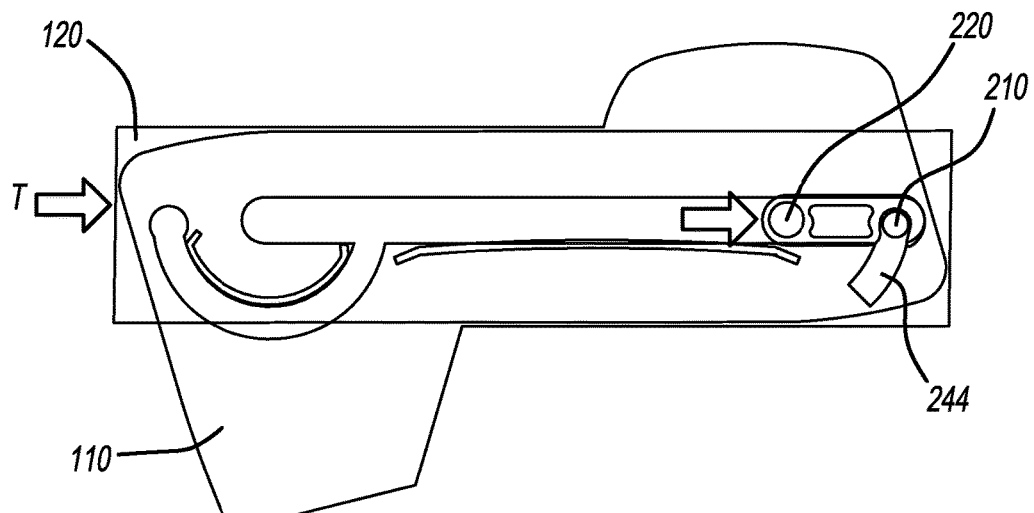

During the movements, the pin shuttle configuration allows the movable cushion portion to move in the forward and reward directions without falling in the curved portions 234, 244 because the movable cushion portion are supported by the first and second pins 210, 220 after the opening 256 of the pin shuttle 250 receives the first pin 210 when the movable cushion portion rotates along the first curved portion 234 of the groove as in FIG. 5B and the pin shuttle keeps to hold the first pin 210 while the movable cushion portion moves rearward (i.e., translational movement "T") to reach the tray position as shown in FIG. 5C. In this form of the seat-cushion-moving mechanism, the pin shuttle and first and second pins move together as the movable cushion portion moves.

Figure 5D:
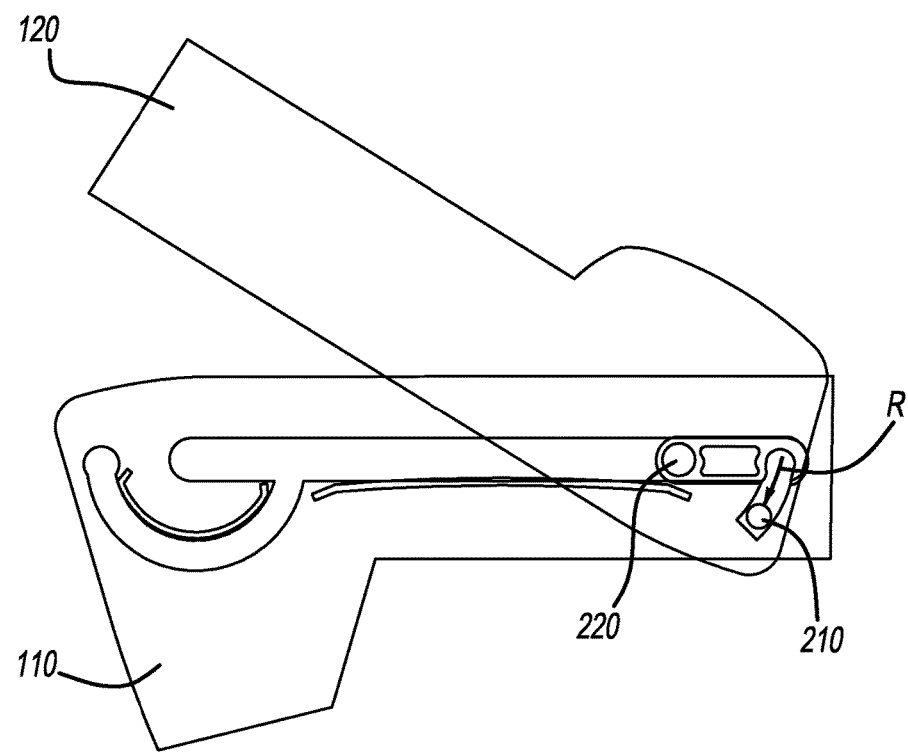

At the end of the rearward movement of the movable cushion portion, the movable cushion portion may rotate upwardly and rearwardly (i.e., rotational movement "R") from the tray position so that a hidden storage formed in the seat base 110 is accessible as illustrated in FIG. 5D. An occupant of the rear row seat may use the hidden storage formed in the seat base and other convenience features (e.g., cup holder and tray) formed in the lower side of the movable cushion portion. For this access position, the seat-cushion-moving mechanism has the second curved portion 244 that meets and intersects with the linear portion 232 at location 243 so that the first pin 210 is able to be relieved from the opening 256 of the pin shuttle and slide along the second curved portion 244 when a user lifts up a forward end of the movable cushion portion. As a result, the movable cushion portion rotates upwardly and rearwardly from the tray position.

Unlike the seat-cushion-moving mechanism having the pin shuttle, FIGS. 7A to 7E illustrate another form of a seat-cushion-moving mechanism that does not need a pin shuttle in order to moves the movable cushion portion 120 between a seating position where a passenger may sit on the movable cushion portion and an extended position where the movable cushion portion in part moves away from a seat base 110. In particular, the seat-cushion-moving mechanism includes: a pin 310 located at a front end of the seat base 110 and a longitudinal groove 330 positioned longitudinally to the side of the movable cushion portion.

Figure 7A:
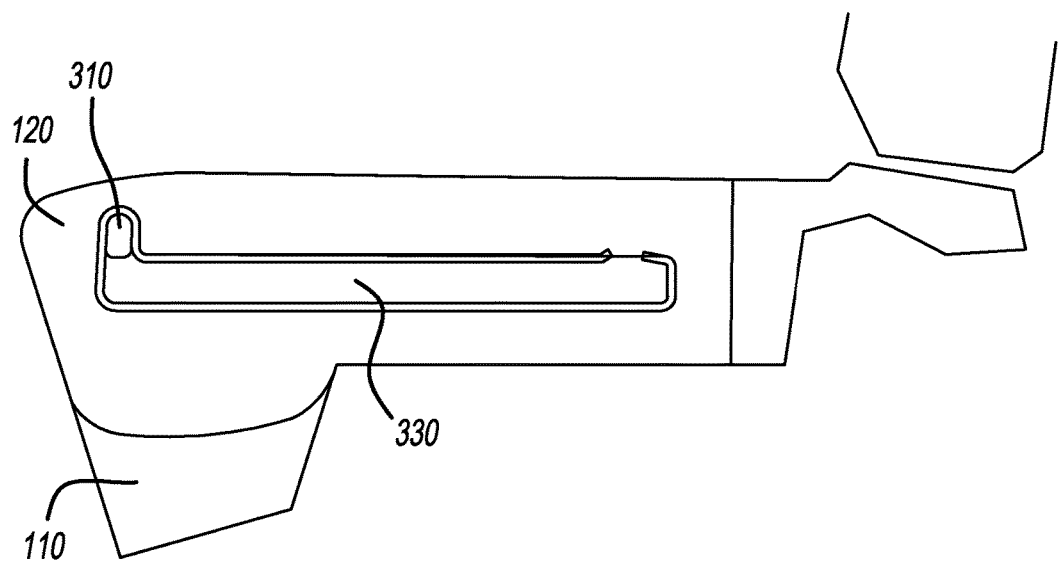
FIGS. 7A-7E are perspective views of a second form of the present disclosure.
Figure 7B:
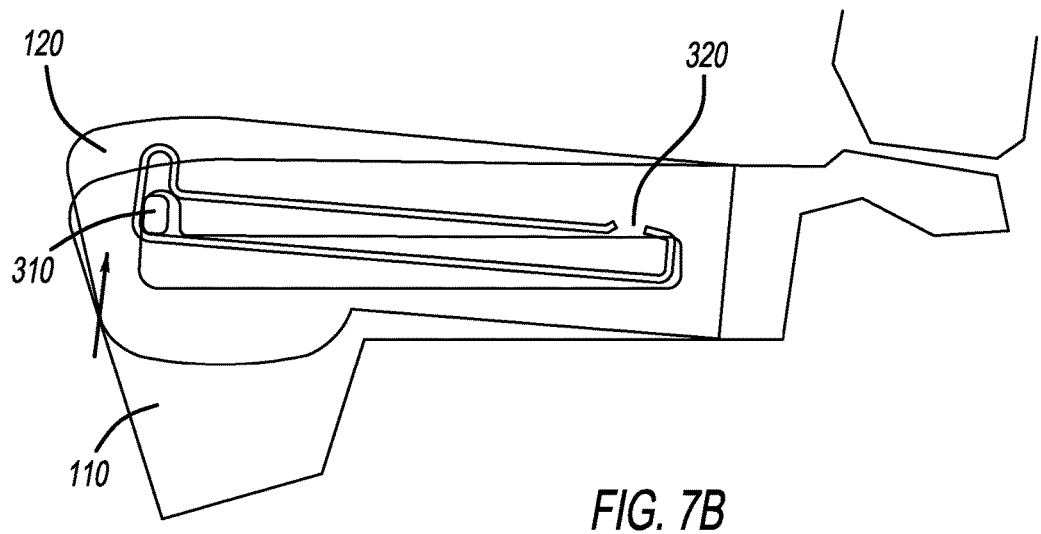
Figure 7C:
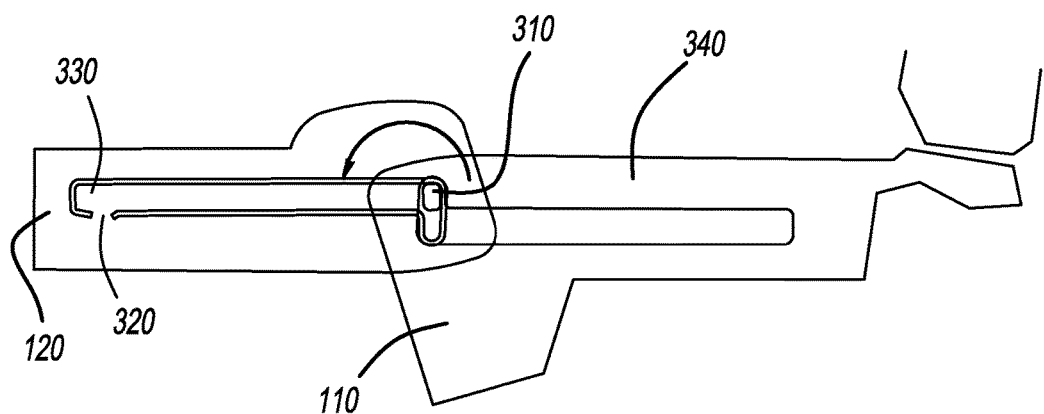
Figure 7D:
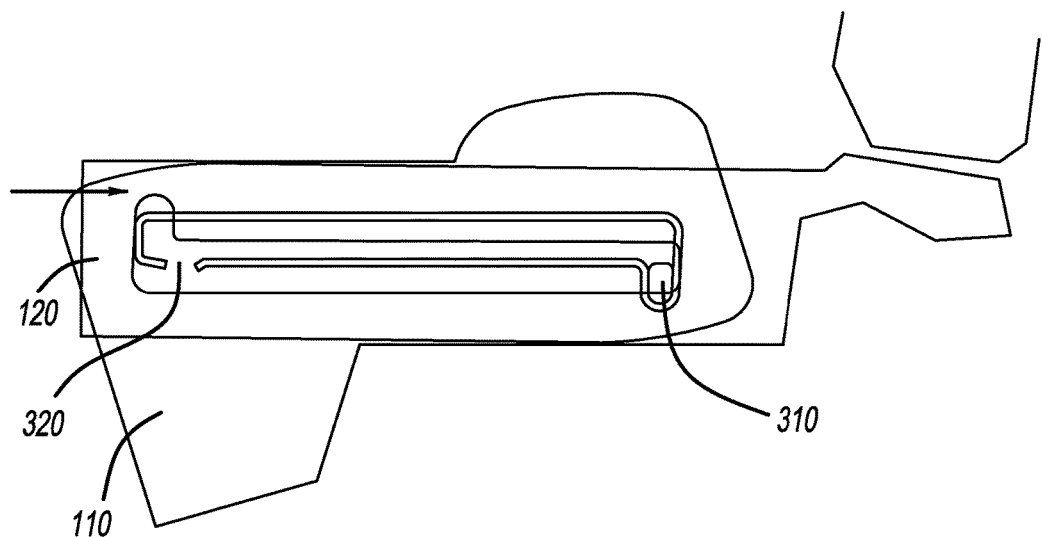

The movable cushion portion may rotate around the pin to be situated in an extended position by lifting up a forward end portion of the movable cushion portion as shown in FIG. 7B, and the pin 310 allows the rotation of the movable cushion portion so that the movable cushion portion covers an upper opening 340 of the seat base (i.e., a tray position of the movable cushion portion). FIGS. 7A, 7C, and 7D illustrate the seating position, the extended position, and the tray position, respectively.

In one form, the longitudinal groove 330 is formed in one or more of, an adjacent portion of the seat cushion 100, a second seat cushion 360 located laterally adjacent to the moveable cushion portion, and the seat base 110. One form of the longitudinal groove 330 is illustrated in FIGS. 7A and 7B, in which a side of the movable cushion portion forms the longitudinal groove.

The longitudinal groove may have an extrusion extended upward at one end to accommodate the pin 310 in the seating position as illustrated in FIG. 7A, and the pin is escaped from the extrusion by pulling up a front nose of the movable cushion portion, thereby rotating in part the movable cushion portion relative to a rear nose located opposite to the front nose in longitudinal direction of a vehicle, so that the movable cushion portion is turned over around the pin 310, reaching in the extended position (See, FIGS. 7B and 7C). In this extended position, a front passenger compartment occupant (e.g., a driver) easily reaches out the movable cushion portion and may use convenience features (e.g., cup holders or a tray) formed a lower side of the movable cushion, which is now exposed in the extended position.

The lower side remains exposed while the movable cushion portion translates reward and provides a rear row seat occupant convenience in utilizing additional tray or cup holders formed in the lower side in the tray position as illustrated in FIG. 7D. As compared locations of the movable cushion portion in the tray and seating positions each other, a location of the movable cushion portion is vertically above a location of the movable cushion portion in the seating position.

Figure 7E:
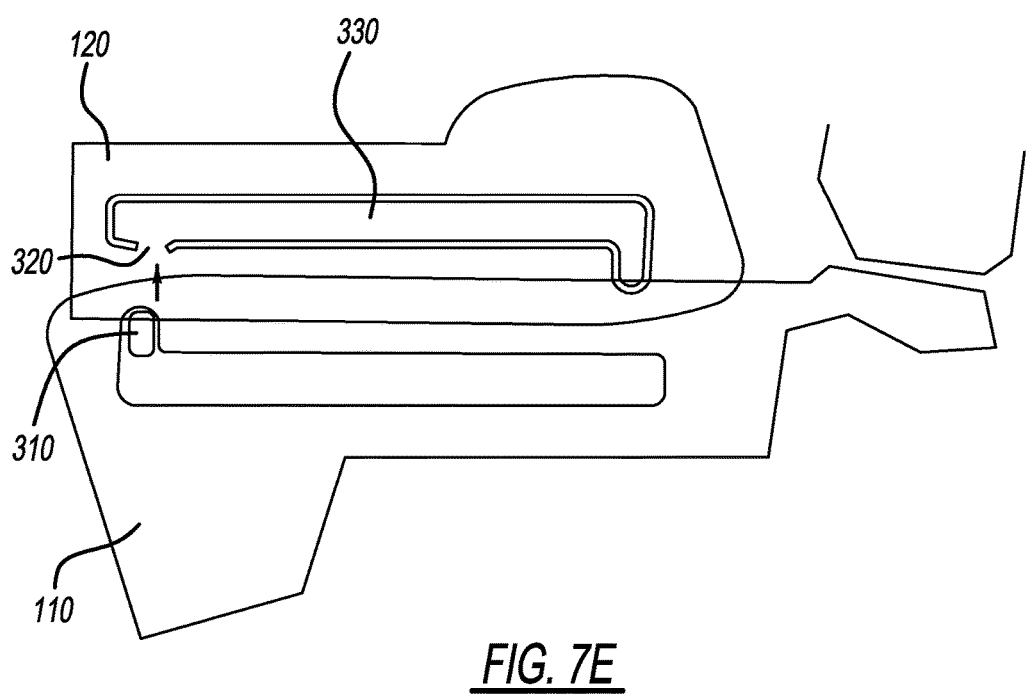

In another form, a slot 320 is formed in the movable cushion portion as illustrated in FIG. 7E, and the pin 310 is configured to pass through the slot so that the movable cushion portion can be disassembled from the seat base. This configuration improves ease of removal or assembly of the movable cushion portion according to user's needs.

Figure 8A:
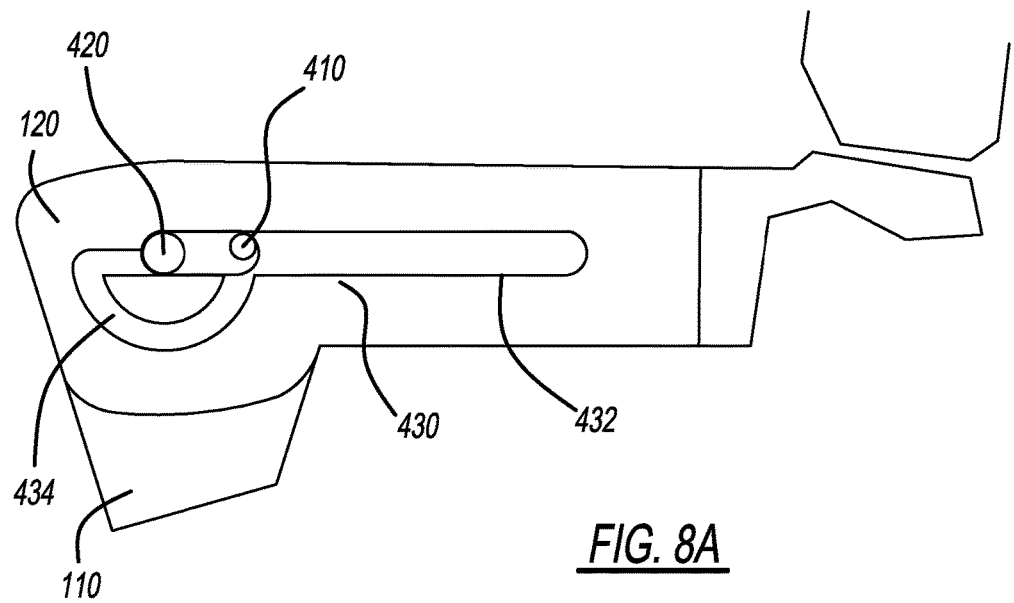
FIGS. 8A-8C are perspective views of a second form of the present disclosure.
Figure 8B:
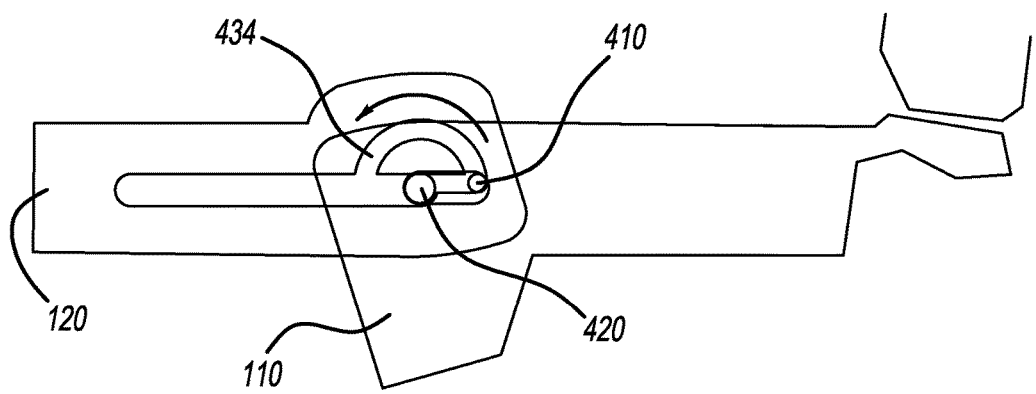
Figure 8C:
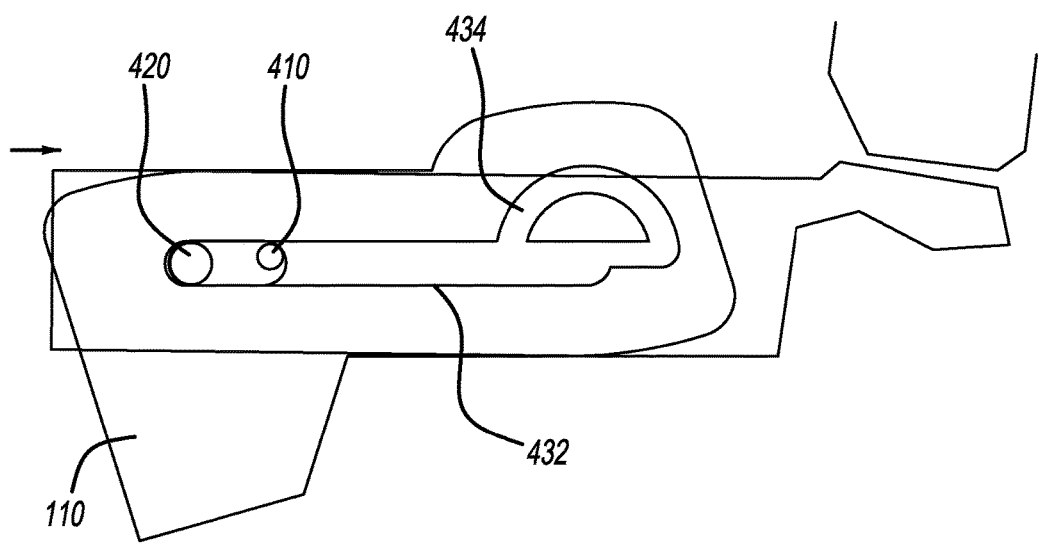

FIGS. 8A-8C illustrate another form of the seat-cushion-moving mechanism. Unlike the seat-cushion-moving mechanism described above with reference to FIG. 4, the seat-cushion-moving mechanism of 8A-8C does not require the pin shuttle, and instead comprises first 410 and second 420 pins configured to move along a groove 430 formed on one of a side of the movable cushion portion 120 or a side of the seat base 110. In particular, the first pin 410 is configured to guide linear and rotational movements of the movable cushion portion relative to the seat base, while the second pin 420 is configured to guide linear movement of the movable cushion portion. In other words, the first pin 410 moves along both the linear portion 432 and the curved portion 434 of the groove 430 whereas the second pin 420 moves along only the linear portion 432 so that the rotational movement of the movable cushion portion occurs when the first pin 410 is guided along the curved portion of the groove.

In one form, the first and second pins 410, 420 are fixed on the side of the seat base 110, and the groove 430 is formed on the side of the movable cushion so that the first and second pins do not move with the movable cushion portion. With this arrangement, the diameter of the second pin 420 may be larger than the width of the curved portion of the groove in order to inhibit the second pin 420 from falling in the curved portion while the translational movement of the movable cushion portion. The curved portion of the groove is formed at a frond end of the groove 230 and intersects with the linear portion.

As illustrated in FIG. 8B, the rotation of the movable cushion portion is enabled after it finishes the linear movement in forward direction along the linear portion of the groove. When the first pin 410 reaches at an intersection point at which the curved portion 434 of the groove meets with the linear portion 432, the movable cushion portion rotates away from the seat base in forward direction so that a lower side of the movable cushion portion is exposed. On the lower side of the movable cushion may be formed various convenience features, for example, a cup holder, a storage tray. One another form, a side surface of the movable cushion may include a hook to hang a bag or personal items. In the extended position as shown in FIG. 8B, a front passenger like a drive can easily access to the convenience features formed in the movable cushion portion.

FIG. 8C illustrates the tray position according to the present disclosure. By translating the movable cushion portion rearwardly from the extended position, the movable cushion portion may cover again the seat base while the lower side of the movable cushion portion remains being exposed so that a rear row seat passenger may use the convenience features formed on the lower side.

Another form of the seat-cushion-moving mechanism is described in FIGS. 9A-9E. The seat-cushion-moving mechanism includes first and second pins 510, 520 which move along a groove 530. The groove 530 may be formed on a side of the movable cushion portion 120 or a side of the seat base 110, and the first and second pins are fixed on the side of the seat base 110. The groove 530 includes a linear portion, and first and second curved portions 534, 544 so that the movable cushion portion may translate back and forward, and rotates as the pin(s) moves along the groove. While the first pin 510 guides linear and rotational movements of the movable cushion portion 120 relative to the seat base, the second pin 520 guides only the linear movement of the movable cushion portion.

Figure 9A:
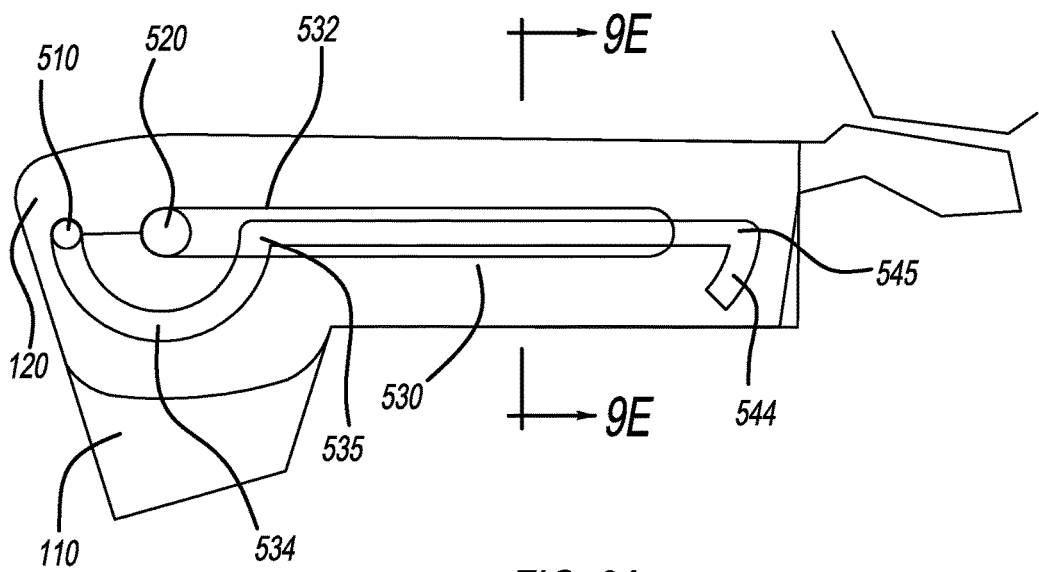
FIGS. 9A-9D are perspective views of a second form of the present disclosure.
Figure 9B:
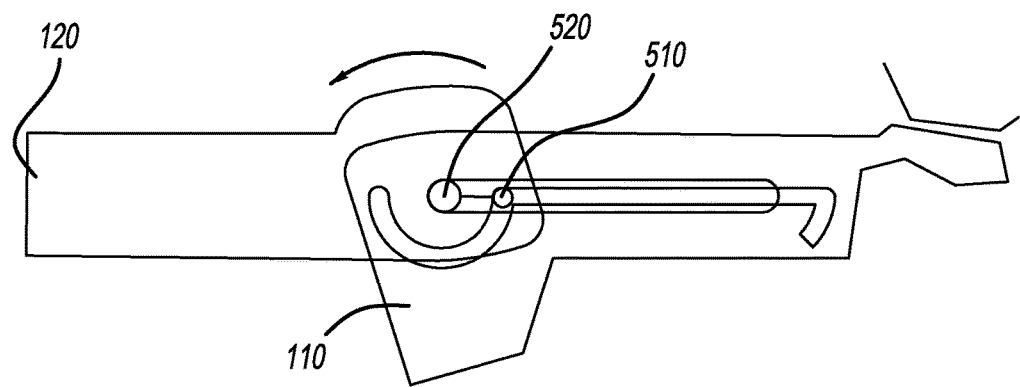
Figure 9C:
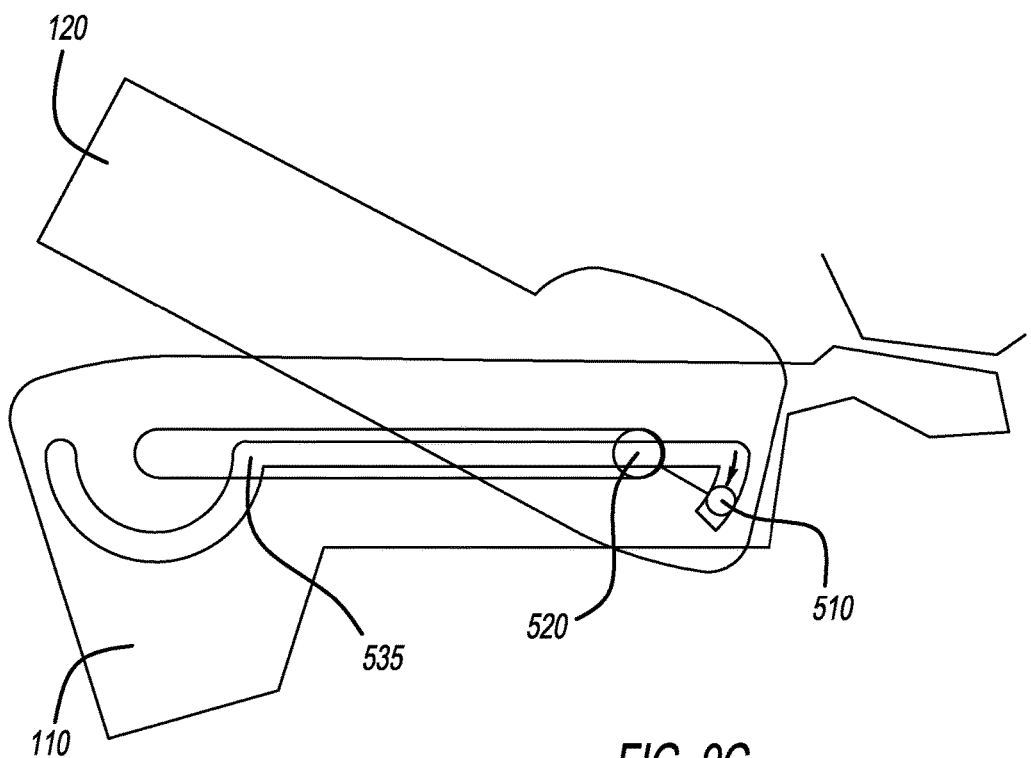

FIGS. 9A-9D illustrate a seating position, an extended position, a tray position, and an access position of the movable cushion portion, respectively. Similar to the exemplary form illustrated with reference to FIGS. 5A-5D, each of these positions can be performed as the movable cushion portion moves back and forward, and rotates along the groove 530. For example, to reach to the extended position as shown in FIG. 9B, the first and second pins 510, 520 move along the linear portion 532, and the movable cushion portion rotates away from the seat base in the forward direction to expose the lower side of the movable cushion portion on which convenience features (e.g., a cup holder, a storage tray) are formed. The rotational movement of the movable cushion portion can be performed as the first pin 510 travels along the first curved portion 534 at the end of the linear movement.

Figure 9D:
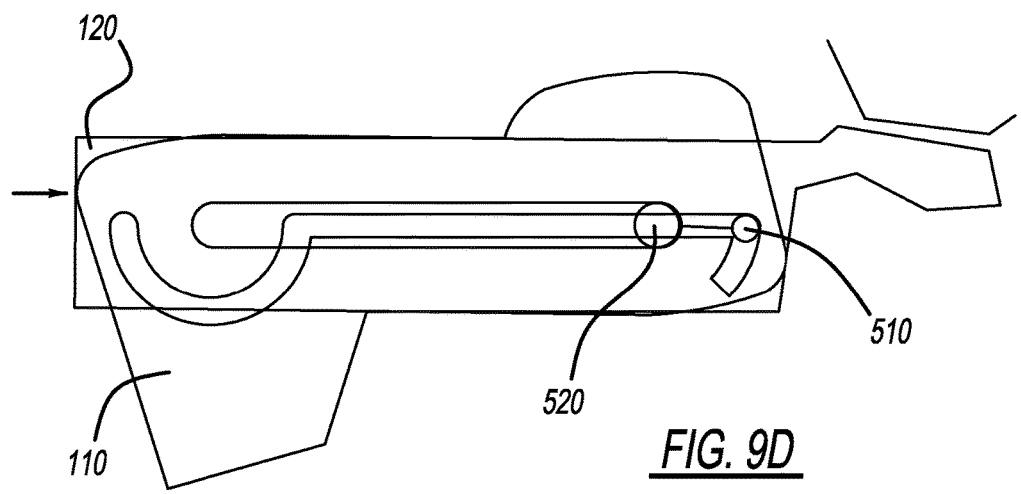

The tray position can be obtained by translating the movable cushion portion rearwardly and the rear row seat passengers easily use the convenience features formed in the lower side (i.e., an upside surface in the tray position) of the movable cushion portion. In the tray position, the first pin 510 is located at an intersection point where the second curved portion 544 meets with the rear end of the linear portion 520 so that the first pin 510 is prepared to move along the second curved portion 544. FIG. 9D shows that the first pin 510 travels along the second curved portion 544 as the movable cushion portion is rotated by lifting up an front end of the movable cushion portion so that the access position is achieved. In the access position, a passenger can access to the storage form inside the seat base and place personal items in it. In other words, a passenger may use both convenience features formed in the lower side of the movable cushion portion and the storage space formed by the seat base.

Figure 9E:
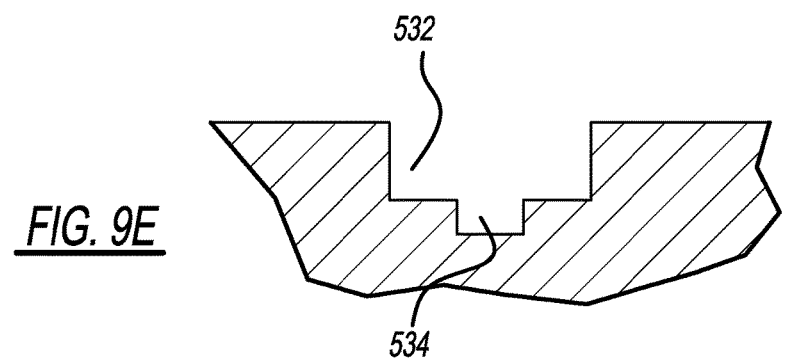
FIG. 9E is a crow section view taken along the line identified in FIG. 9A.

Regarding seat-cushion-moving mechanism illustrated in FIGS. 9A-9E, a length of the first pin 510 is longer than a length of the second pin 520, and a diameter of the second pin 520 is larger than a diameter of the first pin 510. In addition, the groove 530 in part has a complimentary two-step-shaped cross-section configured to guide the corresponding first and second pins as illustrated in FIG. 9E. With this arrangement, the first pin 510 slides along a deep and narrow groove 534 whereas the second pin 520 moves along a wide and shallow groove 532 so that the second pin 520 is inhibited from falling in the curved portion 534 while it crosses over the intersection location and thus smooth translational movement of the movable cushion portion is provided.

Figure 10A:
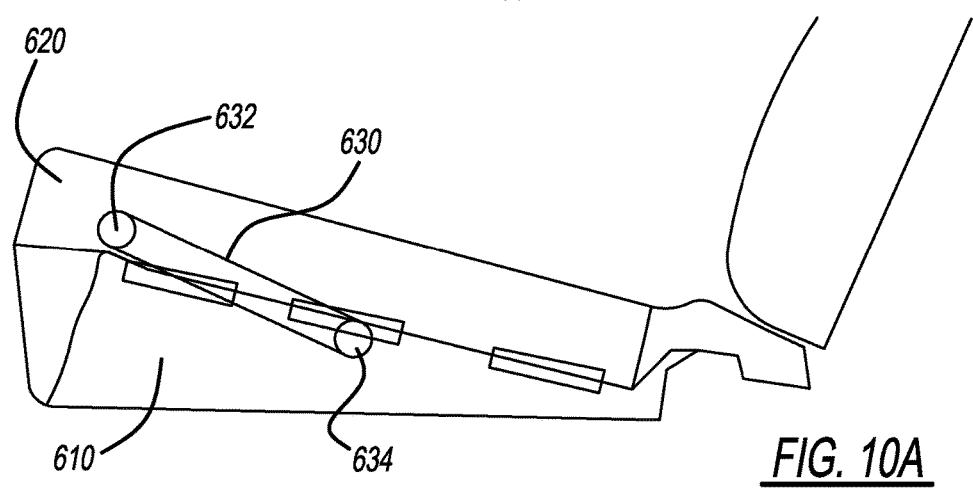
FIGS. 10A-10c are perspective views of a third form of the present disclosure.
Figure 10B:
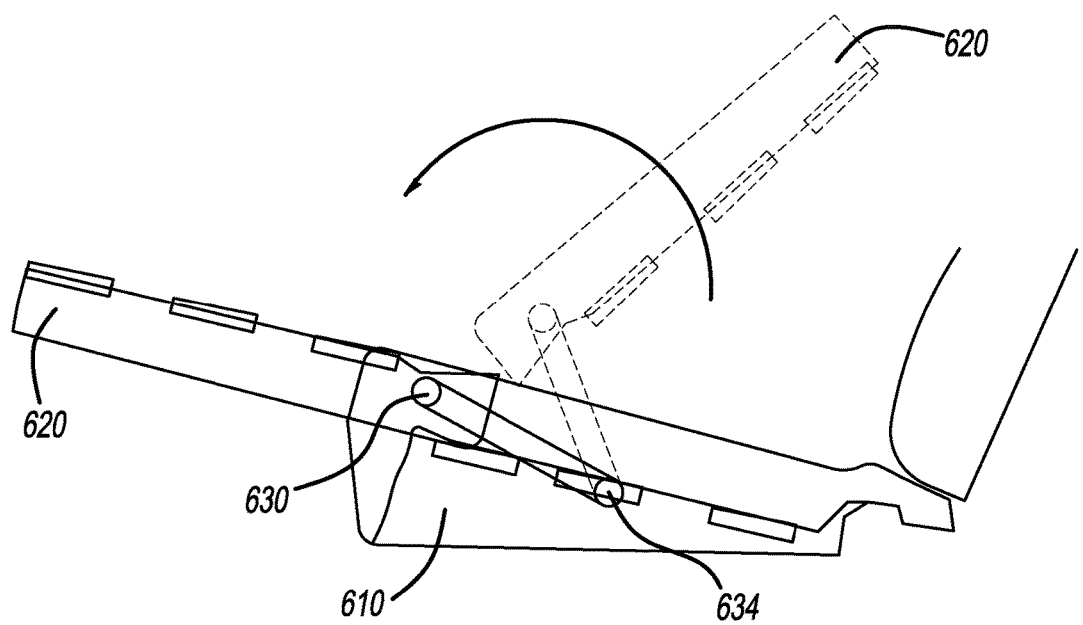
Figure 10C:
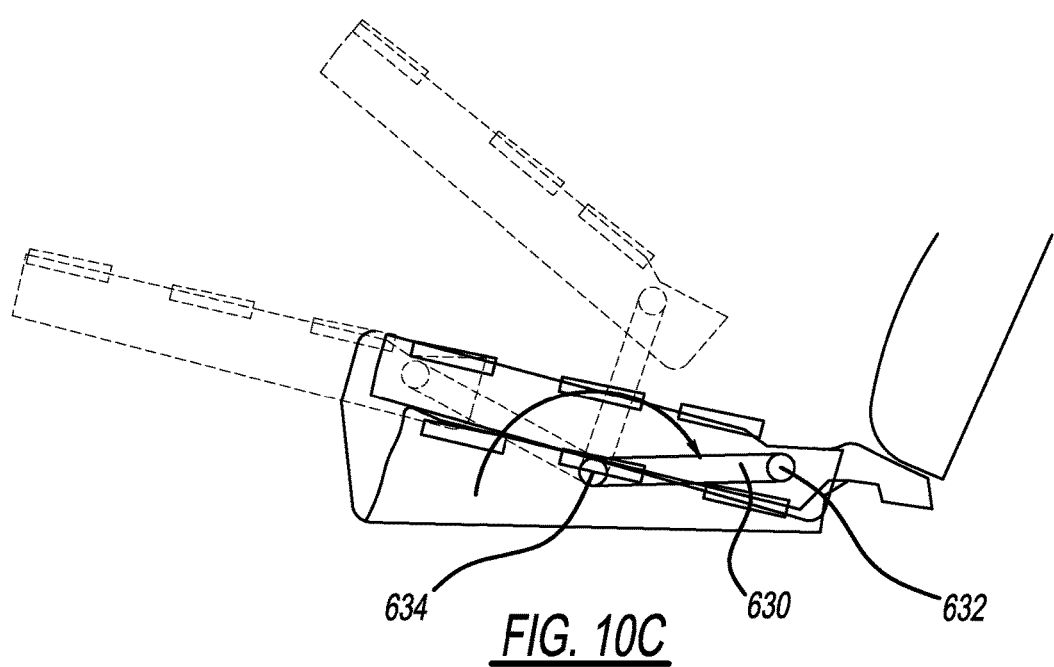

FIGS. 10A, 10B and 10C illustrate a seating position, an extended position and a tray position of the movable cushion portion as described above. However, these positions are achieved by other form of the seat-cushion-moving mechanism which includes a link member 630 pivotally mounted on the movable cushion portion 620 and the seat base 610, respectively. In particular, the movable cushion portion 620 may rotate around a first pivot axis 632 attached on the movable cushion portion and thereby the movable cushion portion 620 is turned over, exposing the lower side of the movable cushion portion. As a result of the rotation, the movable cushion portion is extended forward (i.e., a extended position) so as to provide an easy access to convenience features formed in the lower side of the movable cushion portion from a front row seat.

In the extended position, a storage space placed inside of the seat base is also revealed. Since the link member 630 is able to rotates around the second pivot axis 634 attached on the seat base, the movable cushion portion 620 may rotate rearwardly to be situated in the tray position in which the movable cushion portion covers the storage space formed in the seat base. During the rearward rotational movement of the movable cushion portion, the convenience features formed in the lower side of the movable cushion portion remains exposed to outside, and a rear row seat passenger may still use the convenience features, for example, a cup holder or a tray etc.

What is claimed is:

1. A seat device for a vehicle, the vehicle defining forward and rearward directions and having a floor, the seat device comprising:
    a seat cushion and a seat base, the seat base mounted on the floor of the vehicle and standing upward from the floor and configured to form a support structure of the seat cushion;
    a movable cushion portion having an upper surface configured to form a sitting surface for a passenger;
    a seat-cushion-moving mechanism configured to rotate and translate the movable cushion portion so that the movable cushion portion moves between a seating position where the passenger sits on the upper surface of the movable cushion portion, and an extended position where the movable cushion portion at least partly moves away from the seat base,
    wherein the seat-cushion-moving mechanism comprises,
    first and second pins configured to move along a groove formed on one of a side of the movable cushion portion or a side of the seat base; and
    a pin shuttle cooperating with the groove and configured to guide translational and rotational movements of the movable cushion portion relative to the seat base, the pin shuttle coupled with one of the first or second pins to rotate the movable cushion portion;
    wherein the groove comprises a linear portion and a first curved portion, the first curved portion having one end intersecting with the linear portion at a location spaced away from an end of the linear portion.

2. The seat device of claim 1, wherein the groove comprises a second curved portion having one end intersecting with the linear portion, and the second curved portion is located at opposite to the first curved portion relative to a length of the linear portion.

3. The seat device of claim 1, further comprising a spring strip located along the groove and configured to provide a locking position formed by a recessed portion of the spring strip.

4. The seat device of claim 3, wherein the locking position is located at an ending point of the translational or rotational movements of the movable cushion portion.

5. The seat device of claim 4, wherein the groove comprises the linear portion, the first curved portion, and a second curved portion having one end intersecting with the linear portion at a second location opposite to the first curved portion relative to a length of the linear portion.

6. The seat device of claim 5, wherein an opening of the pin shuttle is configured to receive or release the first pin at the first and second locations.

7. The seat device of claim 1, wherein the seat base comprises a top tray and a bottom tray, forming a storage space.

8. The seat device of claim 1, wherein the pin shuttle is elongated and at one end pivotally fixed around the second pin, and another end of the pin shuttle forms an opening to receive and hold the first pin in the extended position.

* * * * *